US 6,539,306 B2

(12) United States Patent
Turnbull

(10) Patent No.: US 6,539,306 B2
(45) Date of Patent: Mar. 25, 2003

(54) AUTOMOTIVE MIRROR WITH INTEGRATED LORAN COMPONENTS

(75) Inventor: Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/882,855

(22) Filed: Jun. 15, 2001

(65) Prior Publication Data

US 2002/0193946 A1 Dec. 19, 2002

(51) Int. Cl.[7] ............................................... G01C 21/26
(52) U.S. Cl. ................... 701/219; 701/215; 342/357.14
(58) Field of Search ................. 701/219, 207, 701/215, 213, 36, 49; 342/357.01, 357.06, 357.12, 357.14; 359/838

(56) References Cited

U.S. PATENT DOCUMENTS

| | | | |
|---|---|---|---|
| 5,032,845 A | 7/1991 | Velasco | 342/457 |
| 5,576,687 A | 11/1996 | Blank et al. | 340/438 |
| 5,587,715 A | 12/1996 | Lewis | 342/357 |
| 5,631,638 A | 5/1997 | Kaspar et al. | 340/438 |
| 5,798,688 A | 8/1998 | Schofield | 340/438 |
| 5,899,956 A | 5/1999 | Chan | 701/213 |
| 5,971,552 A | 10/1999 | O'Farrell et al. | 359/871 |
| 6,028,537 A | 2/2000 | Suman et al. | 340/988 |
| 6,106,121 A | 8/2000 | Buckley et al. | 359/839 |
| 6,124,886 A | 9/2000 | DeLine et al. | 348/148 |
| 6,166,698 A | 12/2000 | Turnbull et al. | 343/713 |
| 6,229,492 B1 | 5/2001 | Lee et al. | 343/713 |
| 6,326,613 B1 * | 12/2001 | Heslin et al. | 250/239 |

* cited by examiner

Primary Examiner—Yonel Beaulieu
(74) Attorney, Agent, or Firm—Price, Heneveld, Cooper, DeWitt & Litton

(57) ABSTRACT

A vehicle includes a mirror assembly comprising components of a Loran positioning system. The mirror assembly may include an H-field antenna, receiver circuitry, a processor, memory, or a user interface. The Loran system communicates received data with various other vehicle systems over a data bus. Location data obtained from the Loran system is used to ascertain vehicle location, speed, and heading. Further, data from the Loran system is used to improve the accuracy and availability of GPS positioning data and to calibrate the vehicle compass and odometer. The accuracy of GPS position estimates is improved by combining data from both positioning systems. The GPS data is further improved by differential GPS (DGPS) data received by the Loran positioning system and communicated to the GPS positioning system. The availability of the GPS is improved since less than four channels of satellite signals are needed when combined with the Loran signals.

18 Claims, 4 Drawing Sheets

AUTOMOTIVE MIRROR WITH INTEGRATED LORAN COMPONENTS

BACKGROUND OF THE INVENTION

The present invention generally relates to automotive mirrors for vehicles and to vehicle navigation. More specifically, the present invention relates to combining rearview mirror assemblies and positioning systems.

Vehicle positioning systems are known and commonly used in vehicles for purposes relating to vehicle navigation and tracking systems. Currently, two such positioning systems are the Global Positioning System (GPS) and the Global Navigation Satellite System (GLONASS). Both systems utilize a constellation of satellites that transmit microwave signals toward the earth that are received by a ground-based microwave receiver and used to determine the position of the receiver on the earth's surface. Such systems are capable of a high degree of accuracy. Therefore, a great deal of research has been conducted to construct navigation systems that may be readily incorporated into a vehicle.

Positioning systems have also been used in vehicles with respect to communication systems, particularly emergency communication systems, whereby a vehicle occupant making an emergency call using a cellular telephone need not actually know the vehicle's exact location in order to have emergency vehicles dispatched to that location. An example of such a system is the ONSTAR® system from General Motors Corporation. Other uses of positioning systems in vehicles include identifying the time zone that the vehicle is currently in, and determining which zone of magnetic variance the vehicle is in for purposes of calibrating an invehicle electronic compass. See U.S. Pat. Nos. 5,724,316 and 5,761,094, respectively.

Despite all the research that has been conducted and all the literature that has been generated relating to the use of positioning systems in vehicular applications, there continue to be problems associated with using GPS and GLONASS type systems (i.e., satellite positioning systems) under certain conditions. A particular concern is the unavailability of GPS/GLONASS signals in parking structures, in large cities with tall buildings (i.e., "urban canyons"), and similar GPS/GLONASS hostile environments. GPS/GLONASS satellites transmit signals that are very low power and high frequency (e.g., 1.5 gigahertz). Consequently, reception of GPS/GLONASS signals are typically limited to line of sight and are easily blocked by most structures that block the line of sight between the satellite and the receiver. This problem is noticeable in urban canyons where tall buildings or skyscrapers block the direct line of sight. The problem is also apparent in parking structures, residential garages, any covered or indoor facility, and if the vehicle attitude restricts the line of sight between the antenna and the satellites (e.g., if the vehicle crashes and is inverted). The problem may also occur due to natural barriers such as canyons and foliage. The signal may even be attenuated by seemingly transparent objects such as low-E glass windows in a vehicle. Further, GPS/GLONASS positioning systems typically require signals from at least four satellites in order to make accurate position calculations. Therefore, accurate GPS/GLONASS location information may be disrupted even when signals from three GPS/GLONASS satellites are available.

The prior art has attempted to minimize this problem by using the technique of dead reckoning to provide location information when GPS/GLONASS data is interrupted. Dead reckoning has been used for many years, notably by pilots of aircraft and operators of watercraft. Using this technique, a person starts from a known location and carefully observes the direction and distance of travel to estimate the current location of the person or vessel. Vehicle based dead reckoning systems operate on this same principle and use several sensors to automatically make the position estimates. Some of the sensors used by dead reckoning systems include gyroscopes, ABS (antilock braking system), accelerometers, odometers, and other vehicle sensors. There are many different methods for generating dead reckoning estimates.

Some methods use a gyroscope that provides heading change information that may be combined with odometer information to generate a reasonable estimate of location. However, gyroscopes are expensive and become inaccurate over time. Other methods use the vehicle's ABS system to provide information on the rotation of each wheel that may be translated into distance traveled and heading changes. Using a vehicle's ABS, a heading change is estimated from differences in wheel rotation. For example, when a vehicle makes a left turn, the left wheel turns fewer revolutions than the right wheel. While these systems work reasonably well over short distances and for brief periods, they continue to be deficient in many regards.

First, dead reckoning systems are only estimates of vehicle location and must be frequently updated with actual location information from a GPS or similar positioning system. Secondly, they can be confused by turning the vehicle off, making many tight turns, backing up, being towed, and the like. Third, they may be expensive or difficult to implement if they require, for example, an expensive gyroscope, or if they require data from remote vehicle systems such as an ABS system. Finally, systems requiring access to various vehicle systems complicate installation and are not well suited for retrofit installations.

In addition, there are problems with GPS/GLONASS systems even when satellite signals are available and functioning properly. Under normal conditions, the GPS signals provide accuracy to within about 60 feet. This may be improved to some extent using various complex techniques such as correlators and the like. However, the error remains significant.

Therefore, there exists a need for a system and method to reduce problems associated with vehicle based GPS/GLONASS systems, provide accurate location data in urban canyons and in parking structures, and improve the accuracy and availability of GPS/GLONASS data.

SUMMARY OF THE INVENTION

Accordingly, it is an aspect of the present invention to solve the above problems by providing a rearview mirror assembly incorporating components of a Loran positioning system. Loran is an acronym for long range navigation and is a navigation system that has been in existence since the 1970's. It comprises a network of land based transmitters broadcasting time sensitive signals that a receiver can translate into position estimates.

Another aspect of the invention is to improve the accuracy of position estimates. Yet, another aspect of the invention is to reduce the need for dead reckoning systems. Still another aspect of the invention is to reduce costs by integrating Loran components into a rearview mirror assembly. Another aspect of the invention is to provide a navigation system that is easily retrofit into vehicles.

To achieve these and other aspects of the invention, an inside rearview mirror assembly constructed in accordance with the present invention comprises a mirror housing for mounting a reflective member, a mounting foot for securing the assembly proximate to the front windshield of a vehicle, and at least one component of a Loran positioning system mounted on the mirror assembly. In one aspect of the invention the Loran positioning system replaces the GPS/GLONASS systems. In another aspect of the invention both Loran and GPS/GLONASS positioning systems are used together.

The accuracy of position estimates is improved in a number of ways. First, using Loran alone, position estimates within about 40 feet are possible. Further, proposed upgrades to the Loran transmitters and receivers may improve this accuracy in the near future. Second, accuracy may be improved by combining Loran systems with GPS/GLONASS systems. This may be accomplished in several ways. One method is to average or otherwise combine the position estimates from both the Loran system and the GPS/GLONASS system. If both systems are deemed accurate, then the location estimates can be merely averaged. However, if one system is deemed more accurate that the other, the location estimates can be weighted accordingly. In the alternative, the less accurate system can be used to detect a failure condition in the more accurate system and to operate as a backup for the primary system.

Other methods to improve accuracy include the Loran system receiving differential GPS/GLONASS corrections or the Loran transmitters operating as pseudolites for the GPS/GLONASS system.

Another aspect of the Loran positioning system is that it operates in GPS/GLONASS hostile environments and therefore provides improved location estimates over GPS/GLONASS systems and dead reckoning systems. Therefore, Loran broadcasts can be received inside of parking structures, in urban canyons, and inside of buildings. Therefore, Loran may operate as a replacement for dead reckoning systems.

An advantage of the Loran system is that all the major components may be packaged into the rearview mirror assembly thereby reducing manufacturing costs and simplifying installation.

Yet another advantage of the Loran system is that Loran signals may be received through low-E glass which is often used in vehicles. The low-E glass coatings attenuate the 1.5 gigahertz signals of the satellite navigation systems. Therefore, the coating must be masked in the area around the GPS antenna. Loran signals are high power and low frequency and are not significantly attenuated by low-E glass coatings. Therefore, no masking is required.

Still yet another advantage of the Loran system is that the Loran antenna can receive Loran signal regardless of vehicle attitude. Therefore, even if a vehicle becomes inverted as a result of an accident, a Loran based system may still be able to provide vehicle location.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
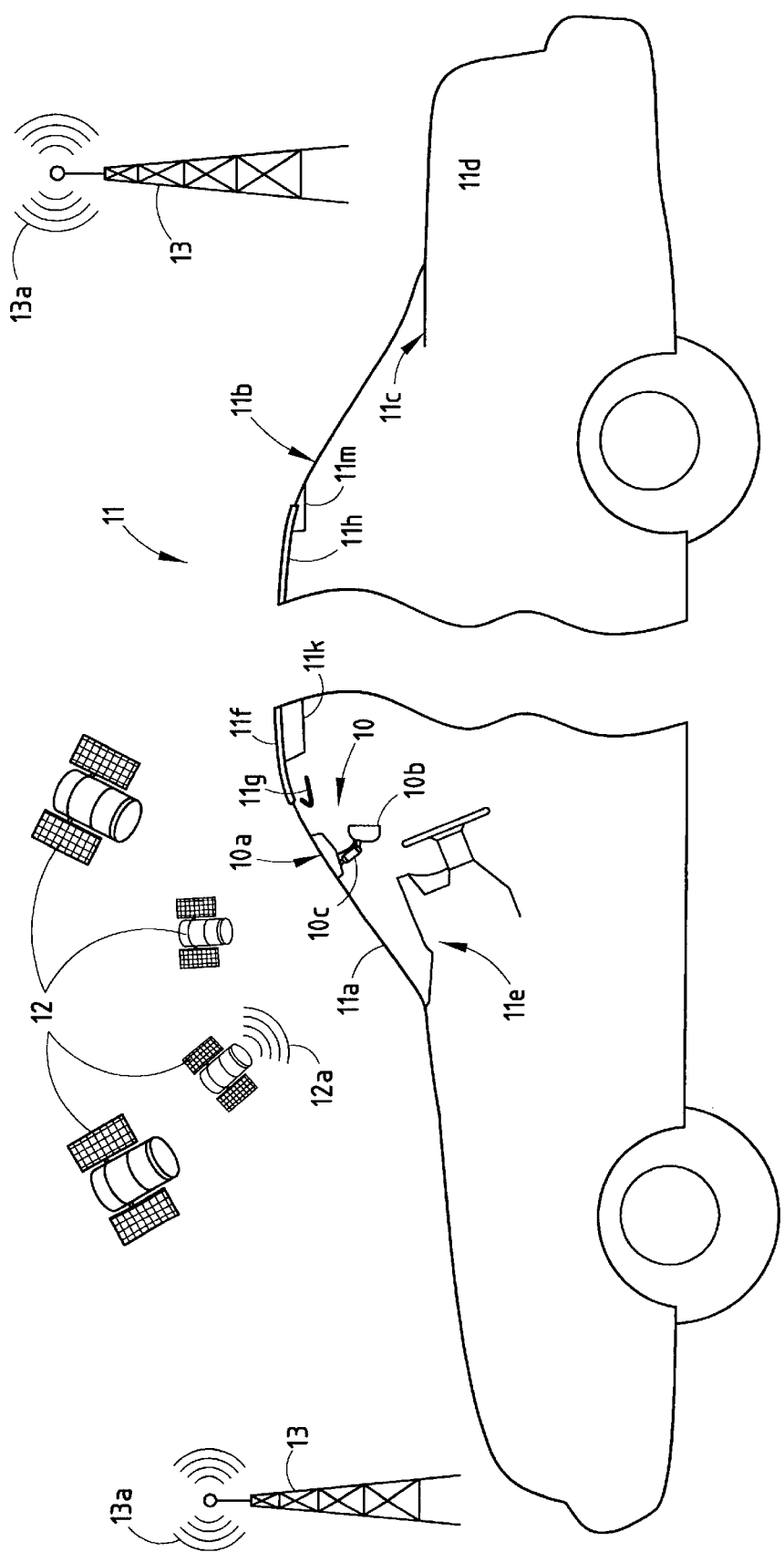
FIG. 1 is a cut-away side view of a vehicle in which the inventive rearview mirror is mounted.

FIG. 1 shows a cut-away side view of a vehicle 11 in which the inventive rearview mirror assembly 10 is mounted. The rearview mirror assembly 10 is mounted to the front windshield 11a of vehicle 11 via mounting foot 10a. Also shown are mirror housing 10b and mirror stem 10c. Preferably, at least one component of the Loran positioning system is mounted to mirror assembly 10. More preferably, both the Loran antenna and the Loran receiver circuit are mounted inside of mounting foot 10a. Due to the characteristics of Loran broadcasts, the Loran antenna may also be mounted on a vehicle accessory in many other locations in the vehicle including the rear window 11b, the rear window deck 11c, the trunk 11d, the instrument panel 11e, the roof 11f, the window glass, the outside mirrors, the sunvisor 11g, the pillars, and the head liner 11h as well as an overhead console 11k and a center high mounted stop lamp (CHMSL) 11m to name a few. Also shown are GPS or GLONASS satellites 12, satellite broadcasts 12a, ground based Loran transmitters 13, and Loran broadcasts 13a.

In one embodiment of the invention, the Loran positioning system is a replacement for the GPS/GLONASS positioning system. Loran has many advantages over a GPS/GLONASS systems. The accuracy of Loran is comparable to GPS. Currently Loran yields position estimates to within about 40 feet. Techniques such as correlation may further improve accuracy and proposed upgrades to the Loran system may also improve accuracy. In addition, Loran systems operate in most environments, such as urban canyons, and therefore reduce the need for dead reckoning systems.

In the preferred embodiment, a Loran positioning system and a GPS positioning system are combined. Loran and GPS positioning systems complement each other in several ways that make them attractive to combine together into a comprehensive vehicle positioning system. First, both systems provide similar accuracy. Both Loran and GPS are capable of identifying a vehicle's location within about 60 feet or less. Also, techniques are available to improve the accuracy of each system.

Second, the signals from each system are very different, and therefore increase the chances that one system will continue to be available when the other is not. For example, Loran is ground based (i.e., the Loran transmitters are located on the ground) while GPS transmitters are located on satellites in space. Another difference is that Loran signals are low frequency, approximately 100 kilohertz, while GPS signals are very high frequency, approximately 1.5 gigahertz. Yet, another difference is signal power. Loran broadcasts are high power, while GPS signals are low power.

Likewise, the technology used to receive these signals is different. Loran receivers may use low cost, low speed, CMOS or bipolar technology. GPS receivers, in contrast, require high-speed technology such as GaAs, SiGe, high performance silicon, or other high-speed fabrication technologies. In summary, the two systems are different in many significant ways and therefore complement each other as will be discussed further below.

One aspect of combining Loran with GPS is to eliminate the need for a dead reckoning system that provides location information when GPS is unavailable. Because Loran remains available in most GPS hostile environments, the need for a dead reckoning system is reduced.

According to another aspect of the invention, Loran location data may be combined with GPS location data to produce a more accurate or repeatable location estimate. The algorithm for combining these estimates may be as simple as averaging the location estimates from each system. However, such an algorithm preferably is more sophisticated and considers factors such as the accuracy of each system.

The invention may also provide differential GPS (DGPS) corrections to improve the accuracy of position estimates. DGPS is a method of improving the accuracy of GPS or GLONASS by correcting for errors in the GPS/GLONASS satellites signals. Ground stations detect errors in the satellite signals and generate a correction that is communicated to GPS/GLONASS receivers. GPS/GLONASS receivers use these corrections to generate position estimates that may be accurate to within inches. One way to transmit these corrections is via the Loran transmitters. This method is already in use in the Netherlands and is called Eurofix. Using a similar technique, DGPS corrections can be received by the vehicle based Loran positioning system of the present invention to improve the accuracy of the on-board GPS/GLONASS system. In this implementation, the Loran data output by the Loran receiver circuit would include both location data and differential GPS/GLONASS data.

Yet another way in which GPS/GLONASS and Loran systems may be combined involves using signals from both systems to generate a position estimate. For example, if fewer than the required number of GPS satellites are available (typically four), position estimates from the Loran system may be used by the GPS as additional GPS satellite coordinates. The GPS is thereby able to generate a position estimate. A proposed enhancement to the Loran system would operate in a similar manner. Under the proposed enhancement, each Loran transmitter is synchronized to universal time coordinated (UTC) and each Loran transmitter could be treated as an additional GPS satellite, or pseudolite. In this manner, a GPS/LORAN receiver unit always has approximately six Loran pseudolites to use in addition to any GPS satellites that are available.

Rearview mirror assembly 10 may also house several other vehicle systems such as telematics systems, GPS/GLONASS systems, compass systems, electrochromic mirrors, communications systems, and the like which may communicate with the Loran system.

Figure 2:
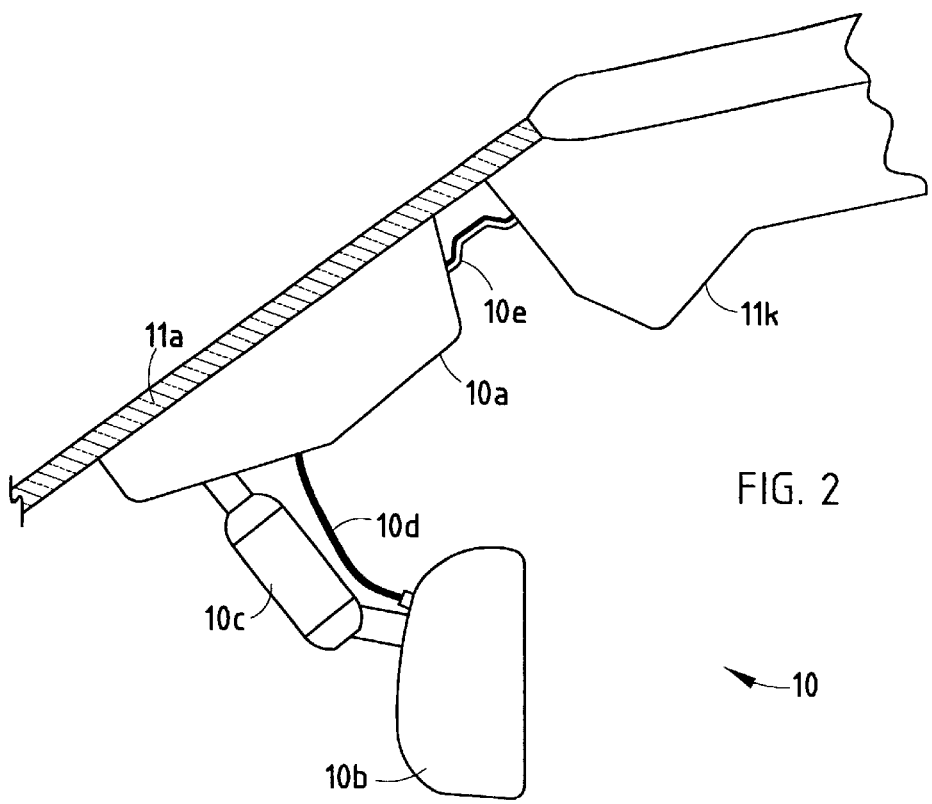
FIG. 2 is a side view of a first embodiment of the inventive rearview mirror assembly.

Turning to FIG. 2, there is shown a side view of a first embodiment of the present invention. Shown in this figure is mirror mounting foot 10a secured to front windshield 11a and supporting mirror stem 10c and mirror housing 10b. At least one of the components of the Loran positioning system is mounted on mirror assembly 10. Preferably, both the Loran antenna and the Loran receiver circuit are mounted in mounting foot 10a. This configuration is functional, visually unobtrusive, and is advantageous for manufacturing, installation, and retrofit reasons. Line 10d communicates signals between mounting foot 10a and mirror housing 10b as needed. For example, mirror housing 10b may include telematics elements, an electrochromic mirror, light sensors, user interfaces and the like. Mirror stem 10c may be designed to enclose line 10d. Global line 10e communicates signals from mirror assembly 10 to the vehicle bus or other remote vehicle system.

Figure 3:
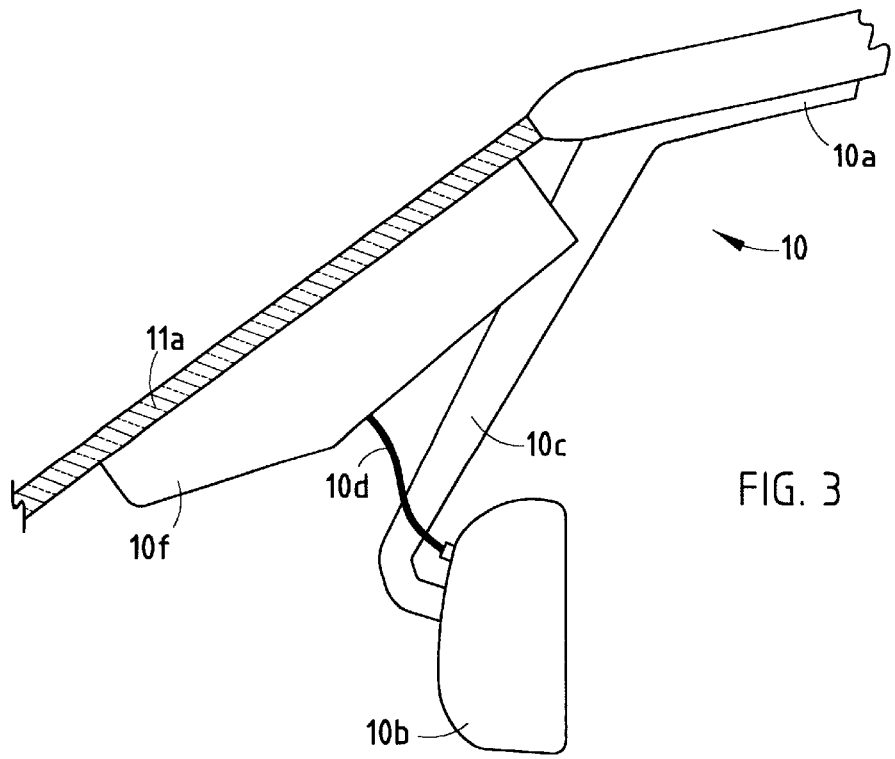
FIG. 3 is a side view of a second embodiment of the inventive rearview mirror assembly.

FIG. 3 is a side view of a second embodiment of the present invention. This embodiment differs from the previous embodiment in that mounting foot 10a is attached to the roof 11f of vehicle 11 and supports mirror stem 10c and mirror housing 10b. In this embodiment, Loran components may be mounted to either mounting foot 10a or mirror housing 10b as discussed above regarding the embodiment of FIG. 2. However, in this embodiment the Loran components may also be mounted in a console housing 10f that is attached to the front windshield 11a of vehicle 11. Lines 10d and 10e (not shown) allow communications with mirror housing 10b and a vehicle bus respectively. This embodiment remains unobtrusive because it is mounted in approximately the same position as a conventional mounting foot. It is also advantageous for installations and retrofit applications because the Loran components and other electronics may be packaged into a single unit and removed or replaced with little interference with the other components of rearview mirror assembly 10. Unlike microwave antennas used for reception of GPS signals, the Loran antenna may be mounted in mounting foot 10a although a line of sight is blocked by vehicle roof 11f. Console housing 10f may also be mounted to virtually any vehicle accessory and is not limited to the vehicle windshield 11a as shown.

Figure 4:
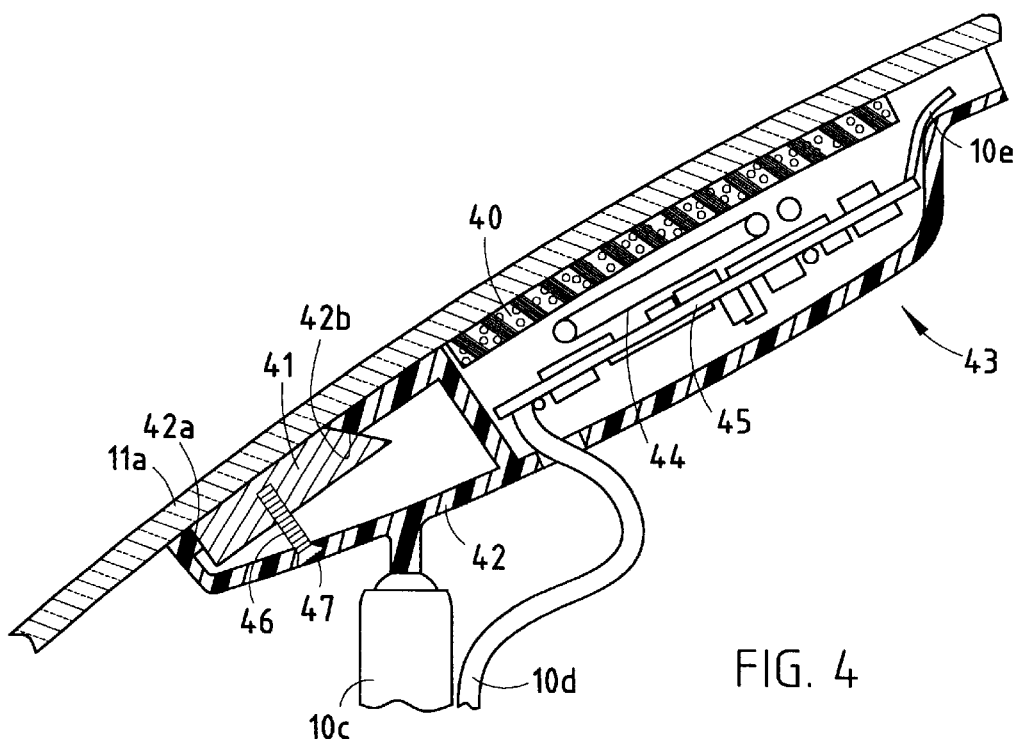
FIG. 4 is a cross-sectional view of the mounting foot of the inventive rearview mirror constructed in accordance with the first embodiment of the present invention.

The design of an exemplary mounting foot of the present invention is illustrated in FIG. 4. The cut-away view of mounting foot 10a is shown attached to windshield 11a and having an antenna housing portion 43 for housing Loran components and possibly other components including GPS/GLONASS components. A mounting portion 42 of foot 10a is secured to windshield 11a by a puck 41. Puck 41 is attached to windshield 10a by adhesive or other conventional method. Mounting portion 42 has an aperture 42a slightly smaller than the surface of puck 41 that is away from windshield 11a. One edge 42B of aperture 42a is a sloped profile to engage an inclined edge of puck 41. A set screw 46 is inserted through screw aperture 47 and threaded into threaded aperture in puck 41. This is only one of many commonly known techniques for mounting mirrors to windshields.

Antenna housing portion 43 of foot 10a encloses a Loran antenna 44 and a Loran receiver circuit 45. Loran antenna 44 is any of several types of antenna suitable for receiving Loran broadcasts. The two primary types of antenna are whip antennas and loop antennas. Whip antennas primarily detect the electrical portion of electromagnetic signals. Whip antennas are acceptable, however, at low frequencies such as Loran's 100 kilohertz band, they also pick up significant amounts of electrical or static interference. Loop antennas (or H-band antennas) are more preferred because they detect the magnetic portion of electromagnetic signals and therefore are less affected by electrical interference at low frequencies. For the current invention, it is preferred to use a ferrite core loop stick antenna. This is a loop antenna that consists of a conductor looped around a stick of ferrite material thereby strengthening the reception characteristic of the antenna. Because ferrite core loop stick antennas are directional, the invention uses two antenna positioned at approximately 90 degrees to each other. Antenna 44 communicates the Loran signal to the Loran receiver circuit 45.

The Loran receiver circuit 45 is housed in antenna housing 43 along with Loran antenna 44. Receiver circuit 45 extracts the Loran data from the Loran signals in a conventional manner known in the art. The theory and operation of Loran is well known to those skilled in the art and will only be described here briefly. As is the practice with Loran, receiver 45 receives signals from at least two Loran transmitters. The Loran receiver detects the time delay between receipt of the Loran signals. A processor (not shown) calculates the distance from each of the Loran transmitters. This produces a circle of potential locations around each Loran transmitter. The processor knows the location of the Loran transmitters and thus the positions defined by each circle. If two Loran signals are received, the two circles intersect at two points and these are the two possible locations of the receiver. Typically one of the two points can be eliminated as unreasonable due to speed and time constraints and the remaining location is selected. If a third Loran signal is received, the location may be identified definitively. The Loran processor may be located in mounting foot 10a, in mirror housing 10b, or elsewhere in the vehicle. A dedicated Loran processor is not required, however, since it is preferred that the Loran computations are done in another vehicle system such as the telematics system, the navigation system, or the GPS positioning system.

Referring again to the Loran receiver circuit 45, it is preferred that correlation technology, similar to that commonly used in GPS receivers, be used in the Loran receiver circuit. The correlation technology for GPS receivers compares the pseudo random code received from the orbiting satellites to known pseudo random code stored in the receiver. By comparing the codes, a GPS receiver is able to accurately determine the amount of time for the signal to travel from the satellite to the receiver and thus compute the distance between the satellite to the receiver. Using correlation technology, the pseudo code is matched more accurately and thereby more accurate timing and distance measurements are made. Applying correlation technology to the Loran receiver can similarly improve accuracy. Using correlation techniques, the Loran receiver more accurately measures the time delays between the signals received from the Loran transmitters. Accurate time measurements translate into improved distance measurements and result in improved location computations.

It is envisioned that both GPS components and Loran components may be packaged into the rearview mirror assembly 10. In this embodiment, a microwave patch antenna and GPS receiver circuit is packaged with the Loran H-field antenna and Loran receiver circuit. Because of the high frequency and low power of the GPS signal, it is preferred that the GPS antenna and the GPS receiver circuit are positioned together in the mounting foot 10a. However, Loran does not have such limitations and therefore the Loran antenna 44 may be mounted elsewhere in the vehicle as desired. Some references discuss mounting microwave antennas in a mirror mounting foot. One such reference is U.S. Pat. No. 6,166,698, issued on Dec. 26, 2000 to Turnbull et al., entitled "REARVIEW MIRROR WITH INTEGRATED MICROWAVE RECEIVER" and is hereby incorporated by reference.

If a GPS antenna is packaged in antenna housing 43, then it may be preferable to provide a foam pad 40 or the like to obscure the view of the antenna for aesthetic reasons. Foam pad 40 should be made of a material with low moisture absorption and low loss factor at microwave frequencies. Closed cell polyethylene foam and GORE-TEX® are two possible materials. On the other hand, a transparent GPS antenna may also be used as disclosed in commonly-assigned U.S. patent application Ser. No. 09/827304 entitled "VEHICLE REARVIEW MIRROR ASSEMBLY INCORPORATING A COMMUNICATION SYSTEM" filed on Apr. 5, 2001 by Robert Turnbull et al., the entire disclosure of which is incorporated herein by reference.

Figure 5:
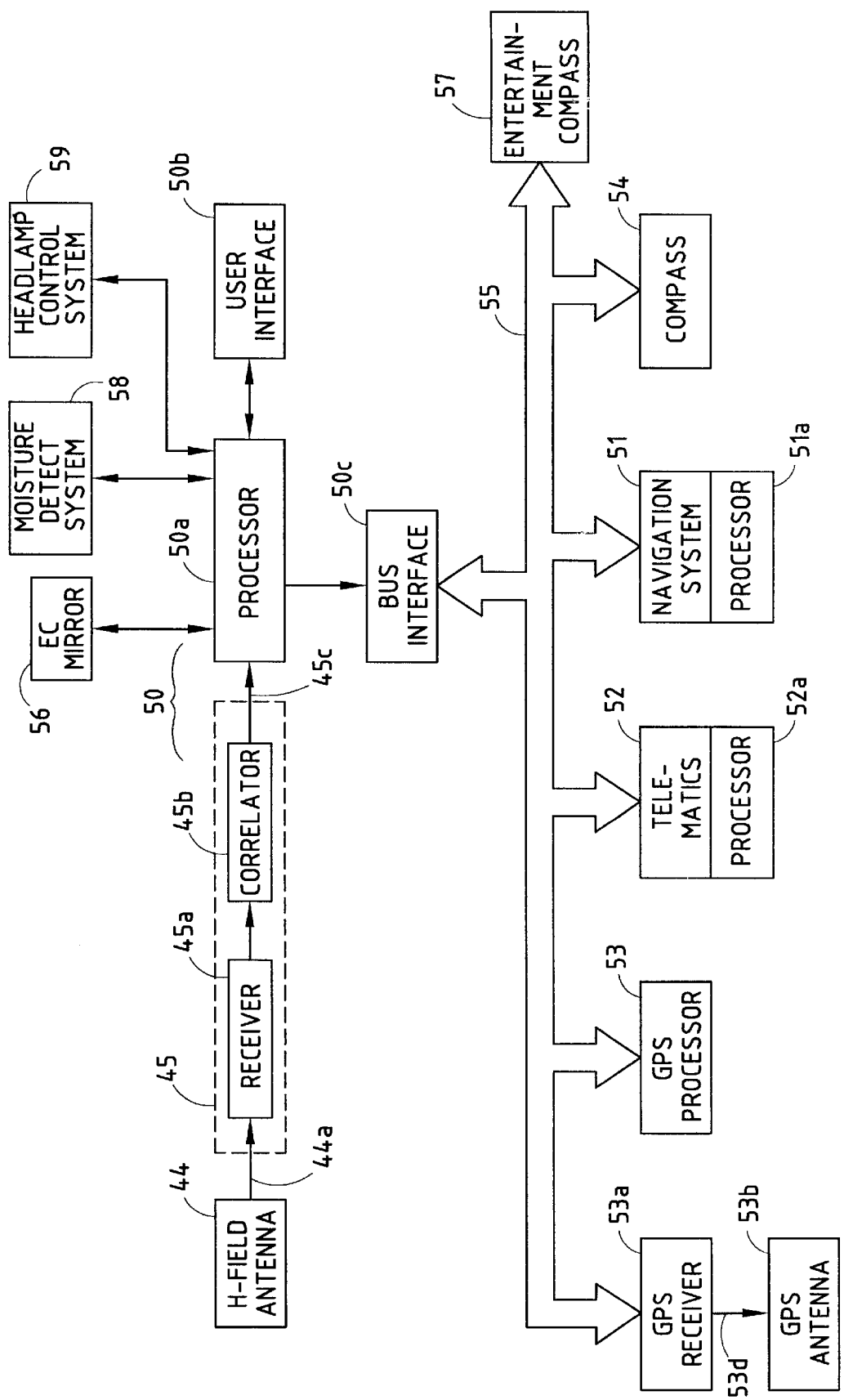
FIG. 5 is an electrical diagram in block form showing the Loran system and various electrical systems that may be coupled to the inventive rearview mirror assembly.

FIG. 5 shows a block diagram of Loran positioning system 50 and various other vehicle systems that may communicate with the Loran positioning system. Turning first to the Loran positioning system 50, there is shown Loran antenna 44, Loran receiver circuit 45 including a receiver 45a and a correlator 45b, a Loran processor 50a, and a user interface and/or display 50b. As discussed above, Loran antenna 44 is preferably an H-field antenna and converts Loran broadcasts into Loran signal 44a that is communicated to Loran receiver circuit 45. Loran antenna 44 may be implemented using transparent conductive material, such as ITO (indium tin oxide), applied to the windshield 11a or other window of the vehicle 11. Loran signal 44a is processed in a conventional manner by receiver 45a. Preferably, receiver circuit 45 also includes an optional correlator 45b that improves the accuracy of the Loran measurements.

Loran receiver circuit 45 communicates the Loran data 45c to processor 50a. Loran data 45c includes all data received by the Loran receiver circuit 45 including location data and DGPS data. Loran processor 50a calculates vehicle position and provides vehicle position information to an operator via user interface 50b. Loran processor 50a includes sufficient processing power and memory to process the Loran information into an appropriate format for communication to user interface 50b. It is preferred that Loran data 45c is communicated to other systems, such as navigation system 51, which includes a database and software for generating an appropriate map that is displayed to the user. User interface 50b preferably includes a heading indicator such as a multi-segment LED display built into mirror assembly 10, but may also include other displays or indicators including audio indicators. For example, the Loran position information may be communicated to a vehicle navigation system for display. The Loran data is communicated to other systems over vehicle bus (e.g., data bus) 55 or over dedicated lines, a local bus, or a wireless communications link. A vehicle bus interface 50d may be used to facilitate communications with bus 55 if needed.

In another embodiment of the invention, Loran processor 50a is not needed. Instead, the Loran data 45c is communicated to one or more of the various vehicle systems over vehicle bus 55 where the data is processed. For example, the Loran data 45c may be communicated to GPS processor 53 that could combine the Loran data with the GPS data to produce a position estimate. In another embodiment, Loran data 45c is communicated to the navigation system 51 or telematics system 52 where data from multiple navigation related sensors are processed. Examples of telematics systems are disclosed in the above-noted commonly assigned U.S. patent application Ser. No. 09/827304.

Alternatively, the Loran system 50 may share a processor with one of the other systems, such as the telematics system 52, the compass system 54, the navigation system 51, an electrochromic mirror circuit 56, a headlamp control system 59, or a moisture detection system 58 that may be integrated into the rearview mirror assembly or located remotely.

Further still the Loran processor 50a may be eliminated and the computation of the vehicle location and heading may be made by a processor not located in the car but rather at a remote location that is otherwise in communication with the vehicle using a wireless communication link. A similar arrangement using GPS data is disclosed in the above-noted U.S. patent application Ser. No. 09/827304.

Loran processor 50a may also be in communication with electrochromic mirror circuit 56. Electrochromic mirrors are reflective devices that may be electrically controlled to reflected more (or less) light as desired. They are typically used as self-dimming rearview mirrors and include light sensors to detect dark ambient conditions and glare from vehicle headlights and the like. Since Loran components may be located in the mirror assembly 10, it may be advantageous to share resources, such as Loran processor 50a, with mirror circuit 56.

Similarly, Loran processor 50a may also be in communication with a moisture detection system 58. Moisture detection systems sense the presence of rain, snow, mist, ice, and possibly fog and may initiate various actions such as the windshield wipers, defroster, windshield washer, and the like. Moisture detection systems are likely to be located in mirror assembly 10 and therefore it may be advantageous to share resources between the moisture detection system 58 and Loran processor 50a.

The GPS system includes GPS receiver 53a, GPS antenna 53b, and GPS processor 53. GPS antenna 53b converts satellite broadcasts 13a into GPS signals 53d that are communicated to GPS receiver 53a. GPS receiver 53a extracts GPS data from the GPS signal and communicates the GPS data to GPS processor 53. GPS processor 53 computes a position estimate as a function of the GPS data. Those skilled in the art understand that the GPS system is one type of satellite positioning systems (SPS) such as GLONASS. GPS and GLONASS are two specific types of spaced based positioning systems and such systems are generically referred to as SPS for purposes of this specification. The accuracy of SPS systems can be improved with the use of differential corrections as discussed above for DGPS. Throughout this specification, GPS refers to a specific type of SPS system.

The compass system 54 may use Loran data in several ways. First, compass system 54 may be calibrated according to the magnetic variance in a particular area. The location of the vehicle is determined using the Loran data and the geographic magnetic variation, for example, can be looked up in a stored table of magnetic variance values. Second, the compass system 54 may be calibrated (or checked for failure) by comparing heading information from the compass system 54 with a heading computed from the Loran data. Heading may be computed from Loran data as the vehicle moves relatively straight in one direction. If the compass system heading disagrees with the computed heading from the Loran data for a predetermined time and exceeds a predetermined tolerance, the compass system may be flagged as failed. If the compass fails, heading data generated from Loran data may be used as a replacement. In the alternative, the magnetic sensing portion of compass system 54 may be eliminated and heading computed solely from Loran data. Compass system 54 may include a display for communicating heading information to an occupant or the heading information may be communicated to another vehicle system for display on that system's user interface.

Entertainment system 57 includes all types of audio and video systems used in vehicles including AM/FM radios, satellite radios, CD players/cassette players, video tape players, television, and the like. These systems include audio and visual user interfaces that may be used to communicate Loran data or information derived from Loran data. For example, vehicle position may be communicated via the speakers or the display screens. Further, Loran data may be used by the entertainment system to program different stations, change the displayed clock time if changing time zones, or the like.

The interaction between a GPS positioning system and several of the systems mentioned above (e.g., headlamp control system and electrochromic mirrors) is discussed in commonly owned U.S. Pat. No. 6,166,698 entitled "REARVIEW MIRROR WITH INTEGRATED MICROWAVE RECEIVER" issued Dec. 26, 2000 to Turnbull et al. and is hereby incorporated by reference. Since a Loran positioning system provides location data similar to a GPS, many of the same interactions are possible.

Figure 6:
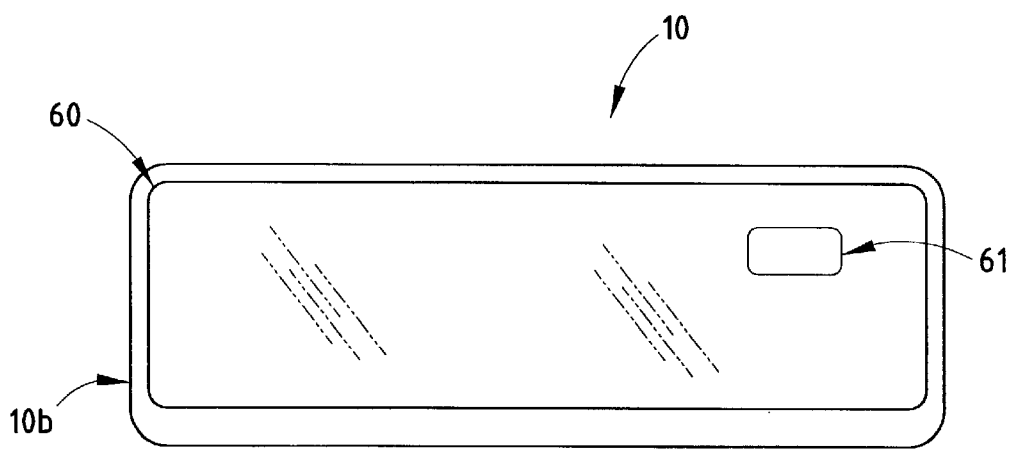
FIG. 6 is a front view of mirror housing.

Turning to FIG. 6 there is illustrated a front view of a mirror housing 10b showing the mirror 60 and a display 61. Display 61 may display location data, directional information, or other information derived from the Loran data extracted by Loran receiver circuit 45. These types of displays have been used to display compass data in the past and typically comprise an LED or similar light producing device mounted behind mirror 60 and projecting light through the partially transparent mirror 60. When used to display information derived from Loran data, display 61 is an element of user interface 50b described above. Display 61 may display a variety of information derived from Loran data including, but not limited to, heading, location, a turn or stop indicator which is activated when the vehicle arrives at a location, and the like.

The method of the invention follows from the description of the apparatus. Loran broadcasts are received from preferably at least two Loran transmitters. Both location data and DGPS corrections may be extracted from the broadcasts. In some embodiments only the location data may be received and extracted. Next, GPS signals from GPS satellites are received if available. The DGPS data is used by the GPS receiver or processor to generate accurate GPS data. Using data from both the Loran and GPS systems, one or more processors calculate the location of the vehicle as a function of the Loran data and the GPS data. If the GPS becomes unavailable, location of the vehicle is calculated as a function of the Loran data and without GPS data. Preferably, the Loran signals are received by a Loran antenna and a Loran receiver, both of which are mounted on the rearview mirror assembly. The method further includes computing various parameters as a function of Loran data. These parameters include vehicle heading, speed, and distance. The method includes combining location data from both systems to produce a combined position estimate. Also, the Loran transmitters are configured to universal time coordinated (UTC) and are processed as GPS pseudolites.

Although various features and embodiments of the present invention have been disclosed as being used in particular configurations, it will be appreciated by those skilled in the art that some of the disclosed features may be implemented separately from one another or in combinations or subcombinations not expressly disclosed. For example, certain features of the system, such as location of the Loran antenna, may be implemented in numerous ways. Similarly, aspects of the invention such as combining the Loran data and GPS data, may be implemented in many ways.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An automotive mirror apparatus comprising:
 an inside rearview mirror assembly comprising:
  a mounting foot adapted to be mounted inside a vehicle in a location proximate to the front windshield of the vehicle,
  a mirror housing, and a stem coupling said mirror housing to said mounting foot;

a Loran receiver circuit mounted to said rearview mirror assembly, wherein said Loran receiver circuit is in communication with at least one other vehicle system, and a Loran antenna in communication with said Loran receiver circuit, wherein said Loran antenna is an H-field antenna and is mounted at a vehicle location selected from the group consisting of: inside rearview mirror assembly, outside rearview mirror assembly, windshield, window glass, rear window, instrument panel, rear window deck, trunk, roof, CHMSL, overhead console, sunvisor, and headliner.

2. The automotive mirror apparatus according to claim 1, wherein said Loran receiver circuit is mounted in said mirror housing.

3. The automotive mirror apparatus according to claim 1, wherein said Loran receiver circuit is mounted in said mounting foot.

4. An automotive mirror apparatus comprising:
an inside rearview mirror assembly comprising:
a mounting foot adapted to be mounted inside a vehicle in a location proximate to the front windshield of the vehicle,
a mirror housing, and
a stem coupling said mirror housing to said mounting foot; and
a Loran receiver circuit mounted to said rearview mirror assembly, wherein said Loran receiver circuit is in communication with at least one other vehicle system,
wherein said at least one other vehicle system is selected from the group consisting of: a telematics system, a navigation system, a SPS system, an entertainment system, a compass, an electrochromic mirror circuit, an odometer, and headlamp controller.

5. An interior rearview mirror based automotive positioning system comprising:
an inside rearview mirror assembly comprising:
a mounting foot adapted to be mounted inside a vehicle in a location proximate to the front windshield of the vehicle,
a mirror housing, and
a stem coupling said mirror housing to said mounting foot; and
a Loran positioning system having a component mounted to said rearview mirror assembly, said Loran positioning system generating Loran data and wherein information derived from said Loran data is communicated to a vehicle occupant, wherein said Loran positioning system is in communication with at least one vehicle system selected from the group consisting of: a telematics system, an SPS system, an entertainment system, a compass system, an odometer, an electrochromic mirror circuit, a moisture sensing system, and a headlamp controller.

6. The interior rearview mirror based automotive positioning system according to claim 5, wherein said component of said Loran positioning system is selected from the group consisting of a Loran antenna, a Loran receiver circuit, a processor, and a user interface.

7. The interior rearview mirror based automotive positioning system according to claim 6, wherein said Loran antenna is an H-field antenna.

8. The interior rearview mirror based automotive positioning system according to claim 6, wherein said Loran receiver circuit includes a correlator.

9. The interior rearview mirror based automotive positioning system according to claim 5, wherein said component of said Loran positioning system is mounted to said mirror housing.

10. The interior rearview mirror based automotive positioning system according to claim 5, wherein said component of said Loran positioning system is mounted to said mounting foot.

11. The interior rearview mirror based automotive positioning system according to claim 5, further comprising an SPS system generating SPS data and wherein said Loran positioning system generates Loran data, wherein said SPS data is combined with said Loran data to yield an improved position estimate.

12. The interior rearview mirror based automotive positioning system according to claim 5, further comprising an SPS system generating SPS data and wherein said Loran positioning system generates differential correction data, wherein the accuracy of SPS position estimates are improved using said differential correction data.

13. The interior rearview mirror based automotive positioning system according to claim 5, further comprising a compass system generating heading data and wherein said Loran positioning system generates Loran location data, and wherein said compass system is calibrated as a function of said Loran location data.

14. The interior rearview mirror based automotive positioning system according to claim 5, wherein said inside rearview mirror assembly is in communication with a vehicle bus and wherein Loran data is communicated on said vehicle bus.

15. The interior rearview mirror based automotive positioning system according to claim 5, further comprising a telematics system in communication with said Loran positioning system and wherein said telematics system receives the Loran data.

16. The interior rearview mirror based automotive positioning system according to claim 5, further comprising a navigation system in communication with said Loran positioning system and wherein said navigation system receives the Loran data.

17. The automotive mirror apparatus according to claim 1, wherein said Loran receiver communicates differential correction data to said at least one other vehicle system.

18. An automotive mirror apparatus comprising:
an inside rearview mirror assembly comprising:
a mounting foot adapted to be mounted inside a vehicle in a location proximate to the front windshield of the vehicle,
a mirror housing, and
a stem coupling said mirror housing to said mounting foot;
a Loran receiver circuit mounted to said rearview mirror assembly, wherein said Loran receiver circuit is in communication with at least one other vehicle system, and
a Loran antenna in communication with said Loran receiver circuit,
wherein said Loran antenna is mounted at a vehicle location selected from the group consisting of: inside rearview mirror assembly, outside rearview mirror assembly, windshield, window glass, rear window, instrument panel, rear window deck, trunk, roof, CHMSL, overhead console, sunvisor, and headliner.

* * * * *